July 11, 1939.  M. P. BLOMBERG  2,165,645

JOURNAL BOX END THRUST ARRANGEMENT

Filed May 23, 1938

Inventor
Martin P. Blomberg
By
Blackmore, Spencer & Flint
Attorneys

Patented July 11, 1939

2,165,645

UNITED STATES PATENT OFFICE 2,165,645

JOURNAL BOX END THRUST ARRANGEMENT

Martin P. Blomberg, Hinsdale, Ill., assignor to General Motors Corporation, Detroit, Mich., a corporation of Delaware Application May 23, 1938, Serial No. 209,521

15 Claims. (Cl. 308—41)

This invention relates to improvements in railway vehicle journal boxes, and more particularly to the provision of means in such boxes for absorbing or cushioning the very heavy end thrust loads which are developed when the axles move laterally with respect to the journal boxes during operation of the vehicle over rough or curved sections of track.

In the usual journal box constructions, lateral movement of the axle relative to the journal box is limited by having a flange or shoulder on the axle come into contact with some portion of the journal bearing, usually the inner end thereof, but since the end thrust loads which are developed under some operating conditions often amount to several thousands of pounds, this results in the portion of the journal bearing which takes the end thrust loads becoming worn away much more rapidly than the rest of the bearing, and this frequently necessitates replacement of the bearing long before it has served its useful life.

In my pending application Serial No. 102,854, filed Sept. 28, 1936 I have disclosed a journal box end thrust arrangement wherein a leaf spring is supported in the journal box adjacent to the end of the axle, and a thrust member is carried upon this spring, the end of the axle engaging the thrust member as the axle tends to move laterally with respect to the journal box, and the leaf spring being deflected to absorb or cushion the end thrust movement of the axle relative to the journal box, so that none of the end thrust load is taken by the journal bearing, and the life of the latter is thereby greatly prolonged.

The present invention is in the nature of an improvement over the structure disclosed in the above referred to application. The improvement consists in forming the thrust member so that it is supported in openings formed in the side walls of the journal box, in providing a channel in the thrust member in which the leaf spring is supported, and in providing a plate for the leaf spring to bear against; which plate is also supported in the channel in the thrust member.

In this construction, the openings in the journal box side walls are made sufficiently longer than the width of the ends of the thrust member which fit into them to permit the thrust member to move the necessary amount to deflect the leaf spring to cushion or absorb the end thrust load caused by the lateral movement of the axle, and after the spring has been deflected this amount, the thrust member comes into contact with the ends of the openings, thereby preventing further movement of the thrust member and holding the deflection of the leaf spring within safe permissible limits.

Other objects and advantages of the present construction will be readily understood upon reference to the specification and accompanying drawing, in which.

Figure 1:
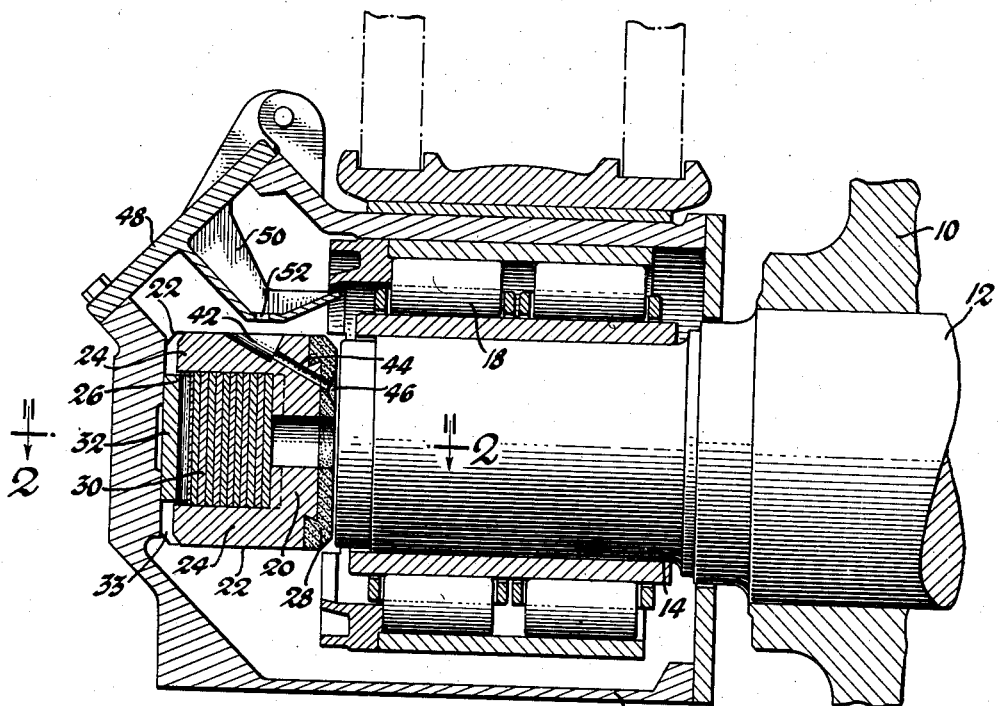
Fig. 1 is a transverse sectional view through a journal box, showing my improved end thrust arrangement associated therewith.

The reference numeral 10 indicates one of the vehicle wheels mounted in the usual manner upon the axle 12, and the journal portion 14 of this axle is supported in the journal box 16 by a journal bearing 18, which in the embodiment illustrated is of the roller type, although it will be understood that the invention may be used equally as well with other types of journal bearings.

Located adjacent to the end of the journal 14 is a thrust member 20 which extends across the journal box, and which has its outer end portions fitting within rectangular shaped openings 22 formed in both side walls of the journal box, so that the thrust member is supported by the journal box side walls. The thrust member is of U-shape in cross-section, having horizontally extending leg portions 24 forming a channel 26 between them which extends the full length of the thrust member. The face of the thrust member adjacent to the end of the journal has connected to it in any suitable manner a facing 28 of any of the well-known anti-friction metals or alloys.

Supported within the channel 26 in the thrust member is a multiple leaf spring made up of a plurality of spring leaves 30 which are of substantially the same length as the thrust member. Also located within the channel is a spring bearing plate 32, the length of which is substantially the same as the thrust member, and the width of which is slightly less than the width of the channel, so that there may be free relative movement between the plate and the thrust member.

The assembly consisting of the thrust member 20, the leaf spring 30 and the spring bearing plate 32, is inserted into the journal box through one of the openings 22 in the side walls thereof, after which the openings are closed by applying cover plates 34, secured to the journal box by fastening members 36, over the openings. It will be noted that the openings 22 are somewhat wider than the width of the thrust member, so that a clearance 33 is provided between the ends of the leg portions 24 and the adjacent edges of the openings, in order that the thrust member may be free to move horizontally a limited amount in the openings in a direction outwardly with respect to the axle.

Figure 2:
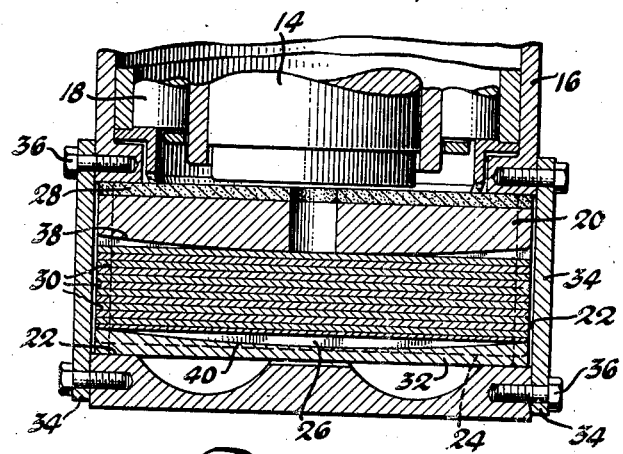
Fig. 2 is a sectional view, taken on the line 2—2 of Fig. 1.

As shown in Fig. 2, under normal conditions when there is no tendency for the axle to move laterally with respect to the journal box, the leaf spring is in straight position as shown, and there is a slight amount of clearance between the end of the journal and the anti-friction facing 28 so that there will be no wear developed at this point. When for any reason the axle is caused to move laterally relative to the journal box, the end of the journal comes into contact with the anti-friction facing on the thrust member and forces the latter against the leaf spring, thereby causing the spring to be deflected into a slightly curved shape. In order to permit such deflecting movement and curving of the spring leaves, the portion of the thrust member which bears against the leaf spring is curved as at 38 to a convex shape conforming to the curvature the spring assumes during such deflecting movement. Since the spring is forced against the bearing plate 32 by the thrust member at this time, the surface of the bearing plate against which the spring bears is likewise curved as at 40 to a concave shape conforming to the spring curvature when so deflected.

It will be understood of course that during such deflecting movement of the spring, a relatively large amount of friction is created between the spring leaves, the latter being so proportioned as to size and strength as to produce the desired amount of resistance necessary to absorb or cushion the maximum end thrust load developed by lateral movement of the axle. Since the necessary resistance will be developed by a relatively small deflecting movement of the leaf spring, and since in order to avoid overstressing of the latter it is necessary to provide some means for limiting the amount the spring may be deflected, the clearance 33 between the thrust member and the edges of the openings 22 is of such dimensions that when the thrust member has been moved far enough to cause the leaf spring to be deflected the desired amount, the ends of the leg portions 24 will come into contact with the edges of the openings 22, so that the thrust member may not be moved any further, and therefore no additional strain may be placed on the leaf spring.

In order to provide adequate lubrication for the engaging surfaces of the anti-friction facing and the end of the journal, a recess 42 is formed in the top of the thrust member and a passageway 44 connects this recess with an oil groove or grooves 46 in the face of the anti-friction material.

A cover plate 48 on the journal box has a well or trough 50 formed on it, and lubricating oil which is carried up from the bottom of the journal box, by the rotation of the journal drips down from the inner surface of the top wall of the journal box and collects in the trough 50 and flows downwardly through an aperture 52 in the bottom thereof into the recess 42, from which it is conducted through the passageway 44 to the oil grooves 46 which distribute it over the engaging surfaces of the end of the journal and the anti-friction facing on the thrust member. These engaging surfaces are made sufficiently large in area to insure that the unit pressure developed in absorbing or cushioning the maximum end thrust loads encountered during service will be kept sufficiently low to provide long life for these surfaces. The curved surface 38 formed on the thrust member permits the latter, even when it is bearing against the leaf spring, to shift angularly a slight amount in the openings 22 if necessary to align the surface of the anti-friction facing exactly parallel with the surface on the end of the journal, so that the entire area of these surfaces will be in contact at all times, thereby further insuring that the unit pressure will be kept within permissible limits.

It will be seen from the above that I have provided a very simple but effective structure for absorbing or cushioning the end thrust loads caused by lateral movement of the axles, in which the only function of the leaf spring is to provide the desired amount of resistance necessary for such absorbing or cushioning action, and in which the spring is positively protected against having greater loads imposed upon it than it can safely withstand. A further advantage is that the location of the leaf spring and the bearing plate within the channel in the thrust member makes a very compact assembly which facilitates handling and insertion into or removal from the journal box.

While I have disclosed a specific embodiment of my invention, it will be understood that various changes in size, shape and arrangement of parts may be made without departing from the spirit and scope of the appended claims.

I claim:

1. In a journal box having side walls, a journal in said box, a thrust member located in said box adjacent to the end of the journal, the ends of the thrust member being supported by the side walls of the journal box, and a leaf spring associated with the thrust member for cushioning movement of the journal relative to the box.

2. In a journal box having side walls a journal in said box, a thrust member located in said box adjacent to the end of the journal, the ends of the thrust member being supported by the side walls of the journal box and the thrust member being movable relative to the journal box, a spring bearing plate supported by the thrust member and adapted to abut against a portion of the journal box, and a leaf spring interposed between the thrust member and the spring bearing plate for cushioning movement of the journal relative to the box.

3. In a journal box having side walls, a journal in said box, a thrust member located in said box adjacent to the end of the journal, the ends of the thrust member being supported by the side walls of the journal box, and a leaf spring against which the thrust member is adapted to bear for cushioning movement of the journal relative to the box, the face of the thrust member which bears against the spring being curved to conform to the curvature the spring assumes during such cushioning movement.

4. In a journal box having side walls, a journal in said box, a thrust member located in said box adjacent to the end of the journal, the ends of the thrust member being supported by the side walls of the journal box and the thrust member being movable relative to the journal box, a spring bearing plate adapted to abut against a portion of the journal box, a leaf spring interposed between the thrust member and the plate for cushioning movement of the journal relative to the box, the faces of the thrust member and of the plate which bear against the spring being curved to conform to the curvature the spring assumes during such cushioning movement.

5. In a journal box having side walls, a journal in said box, a thrust member located in said box adjacent to the end of the journal, the ends of the thrust member being supported by the side walls of the journal box, and a leaf spring supported by said thrust member for cushioning movement of the journal relatively to the box.

6. In a journal box having side walls, a journal in said box, a thrust member located in said box adjacent to the end of the journal, the ends of the thrust member being supported by the side walls of the journal box, a spring bearing plate adapted to abut against a portion of the journal box, and a leaf spring interposed between the thrust member and the plate for cushioning movement of the journal relative to the box, both said plate and said spring being supported by the thrust member.

7. In a journal box having side walls with openings formed therein, a journal in said box, a thrust member located in said box adjacent to the end of said journal and having its ends supported in said openings, and a leaf spring associated with said thrust member for cushioning movement of the journal relative to said box.

8. In a journal box having side walls with openings formed therein, a journal in said box, a thrust member located in said box adjacent to the end of the journal and having its ends supported in said openings, a spring bearing plate having its ends received in said openings, and a leaf spring located between the thrust member and the plate for cushioning movement of the journal relative to said box.

9. In a journal box having side walls with openings formed therein, a journal in said box, a thrust member located in said box adjacent to the end of said journal and having its ends supported in said openings, said thrust member having a convex surface formed thereon on the side opposite to that adjacent to the journal, and a leaf spring against which the convex surface is adapted to bear to cushion movement of the journal relative to said box.

10. In a journal box having side walls with openings formed therein, a journal in said box, a thrust member located in said box adjacent to the end of the journal and having its ends supported in the openings, said thrust member having a convex surface formed thereon on the side opposite to that adjacent to the journal, a spring bearing plate having its ends received in said openings and having a concave surface formed thereon, and a leaf spring located between the convex surface on the thrust member and the concave surface on the plate for cushioning movement of the journal relative to the box.

11. In a journal box having side walls with openings formed therein, a journal in said box, a thrust member located in said box adjacent to the end of the journal and having its ends supported in said openings, said thrust member having a channel formed therein, and a resilient member for cushioning movement of the journal relative to the box, said resilient member being supported in said channel.

12. In a journal box having side walls with openings formed therein, a journal in said box, a thrust member located in said box adjacent to the end of the journal and having its ends supported in said openings, said thrust member having a channel formed therein, and a leaf spring for cushioning movement of the journal relative to the box, said spring being supported in said channel.

13. In a journal box having side walls with openings formed therein, a journal in said box, a thrust member located in said box adjacent to the end of the journal and having its ends supported in said openings, said thrust member having a channel formed therein, a leaf spring for cushioning movement of the journal relative to the box, and a plate against which said spring is adapted to bear, both said spring and said plate being supported in said channel.

14. In a journal box having side walls with openings formed therein, a journal in said box, a thrust member located in said box adjacent to the end of the journal and having its ends supported in said openings, said thrust member having a channel formed therein, a bearing plate adapted to abut against a portion of the journal box, and a leaf spring located between said thrust member and said bearing plate for cushioning movement of the journal relative to the box, both said bearing plate and said leaf spring being located in said channel, and the surfaces of the bearing plate and of the thrust member against which the spring bears being curved to conform to the curvature the spring assumes during such cushioning movement.

15. In a journal box having side walls with openings formed therein, a journal in said box, a thrust member located in said box adjacent to the end of the journal and having its ends supported in said openings, a bearing plate supported by the thrust member and adapted to abut a portion of the journal box, and a leaf spring located between the thrust member and the bearing plate, said spring being adapted to be deflected to cushion movement of the journal relative to the box, said thrust member being adapted to seat against a portion of the journal box to prevent further deflecting movement of the leaf spring after the latter has been moved a predetermined amount.

MARTIN P. BLOMBERG.